(12) United States Patent
Roither (10) Patent No.: US 6,377,010 B1
(45) Date of Patent: Apr. 23, 2002

(54) ELECTROMOTIVE DRIVE FOR A FURNITURE ITEM

(75) Inventor: Andreas Roither, Bielefeld (DE)

(73) Assignee: Dewert Antriebes- und Systemtechnik GmbH & Co. KG, Kirchlengren (DE)

( * ) Notice: Subject to any disclaimer, the term of this patent is extended or adjusted under 35 U.S.C. 154(b) by 0 days.

(21) Appl. No.: 09/705,626

(22) Filed: Nov. 3, 2000

(30) Foreign Application Priority Data

Nov. 3, 1999 (DE) .......................................... 299 19 214

(51) Int. Cl.$^7$ ............................. H02K 7/06; H02P 5/40
(52) U.S. Cl. ................... 318/560; 318/432; 310/80; 310/83
(58) Field of Search ................... 318/280–293, 318/110–116, 560, 12, 102; 185/40 R; 310/80–85; 188/299; 451/8; 29/407.08, 715, 263.5; 74/424, 8 VA, 89.15; 297/362.14, 362.11, 320, 330; 192/7, 164; 409/231; 408/13, 152

(56) References Cited

U.S. PATENT DOCUMENTS

| | | | | |
|---|---|---|---|---|
| 4,000,661 A | * | 1/1977 | Menzel | |
| 4,448,382 A | * | 5/1984 | Melone | |
| 4,915,313 A | * | 4/1990 | Banner et al. | |
| 4,936,521 A | * | 6/1990 | Jorg | |
| 5,027,048 A | * | 6/1991 | Masrur et al. | |
| 5,041,748 A | * | 8/1991 | Huber | |
| 5,060,959 A | * | 10/1991 | Davis et al. | |
| 5,370,011 A | * | 12/1994 | Gilges et al. | |
| 5,472,065 A | * | 12/1995 | Vergin | |
| 5,538,115 A | * | 7/1996 | Koch | |
| 5,651,645 A | * | 7/1997 | Wawrzyniak et al. | |
| 5,759,000 A | * | 6/1998 | Wawrzyniak et al. | |
| 5,765,668 A | * | 6/1998 | Hasselberg et al. | |
| 5,865,272 A | * | 2/1999 | Wiggins et al. | |
| 5,884,970 A | * | 3/1999 | Howard | |
| 5,987,726 A | * | 11/1999 | Akeel | |
| 6,158,295 A | * | 12/2000 | Nielsen | |
| 2001/0000271 A1 | * | 4/2001 | Akeel | |

* cited by examiner

*Primary Examiner*—Paul Ip
(74) *Attorney, Agent, or Firm*—Henry M. Feiereisen (57) ABSTRACT

A electromotive drive for a furniture item, in particular lifting device; includes a housing, a drive motor mounted to the housing, a reduction gear unit interacting with the motor, a rotating spindle driven by the reduction gear unit and carrying a spindle nut which is secured against executing a rotational movement so as to move in a linear direction. A flanged tube is mounted to the housing and accommodates a lifting tube which is mounted to the spindle nut so as to be movable between retracted and extended positions when the spindle rotates and the nut is moved in a linear direction. At least one gas spring is arranged within the flanged tube for assisting the lifting tube during a movement of the lifting tube to the extended position, with the gas spring having a piston rod which is movable in retracted and extended positions in synchronism with the lifting tube.

27 Claims, 6 Drawing Sheets

ELECTROMOTIVE DRIVE FOR A FURNITURE ITEM

CROSS-REFERENCES TO RELATED APPLICATIONS

This application claims the priority of German Patent Application Serial No. 299 19 214.8, filed Nov. 3, 1999, the subject matter of which is incorporated herein by reference.

BACKGROUND OF THE INVENTION

The present invention relates, in general, to an electromotive drive for a furniture item, and more particularly to a lifting device for elevating and lowering a furniture item.

Electromotive drives for furniture items are known in a wide variety of designs for positionally adjusting furniture components, and typically include a drive motor, a reduction gear unit and a rotatably driven spindle which supports a spindle nut secured against carrying out a rotation movement and carrying a lifting tube which is arranged inside an outer flanged tube and moveable in and out relative thereto. For safety reasons, the drive motors are DC motors which are supplied with a safety voltage. The reduction gear unit is normally a worm gearing as the speed ratio of the rotor of the drive motor must be very high compared to the speed of the spindle. Therefore, the linearly moving spindle nut travels at an extremely low velocity. Normally, a connection piece in the form of a fork head is securely mounted to the free end of the lifting tube.

Heretofore, furniture drives are generally only required to apply a force that is capable to overcome the own weight of the furniture item; However, there is increasingly a demand for drives which are capable to adjust the height of furniture items that are exposed to a load, for example, tops of working tables or like articles having objects placed on them. Moreover, it is also desirous to increase the adjusting speed of such furniture items.

SUMMARY OF THE INVENTION

It is thus an object of the present invention to provide an improved electromotive drive for furniture items, obviating the afore-stated drawbacks.

In particular, it is an object of the present invention to provide an improved electromotive drive for furniture items by which the thrust force generated by the driving power of the drive motor can be supplemented or the driving power of the motor can be reduced while still generating a same thrust force.

These objects, and others which will become apparent hereinafter, are attained in accordance with the present invention by providing a drive motor mounted to a housing and interacting with a reduction gear unit, a rotating spindle driven by the drive motor via the reduction gear unit and carrying a spindle nut which is secured against executing a rotation movement so as to move in a linear direction, a flanged tube mounted to the housing, a lifting tube received in the flanged tube and mounted to the spindle nut so as to be movable between retracted and extended positions when the spindle rotates and the nut is moved in a linear direction, and at least one gas spring arranged within the flanged tube for assisting the lifting tube during a movement of the lifting tube to the extended position, wherein the gas spring has a piston rod which reciprocates in synchronism with the lifting tube.

Structure and operation of a gas spring are generally known to a person skilled in the art. Although their reliability has been shown for use in many applications, gas springs are incapable to tilt or lift an attached furniture component when relatively great forces are required. Through the novel and inventive combination of an electric motor with a gas spring, the thrust force produced by the electric motor can now be increased by the force applied by the gas spring so that greater loads can be moved than would have been feasible with conventional furniture drives. The gas spring is, however, not only employed to increase the thrust force, but in fact serves a dual function, because in addition to the increase of the thrust force for lifting or upward tilting of the furniture item, the gas spring operates also as a brake when the furniture item descends. This is important because the own weight of the furniture item normally results in an accelerated descent. There is also the added advantage that the braking force is applied with the aid of the gas spring. A reliable operation is realized when the forces applied by the spindle nut and the gas spring act in a same direction as the spindle nut. The drive can be so dimensioned as to apply only the force that, upon retraction of the spindle nut, is necessary to implement a retraction of the piston rod of the gas spring.

According to another feature of the present invention, the spindle is a hollow spindle for accommodation of the gas spring, thereby realizing a simple and compact configuration. As the spindle turns when the drive motor operates, the bore of the hollow spindle may be so sized as to enclose the gas spring without encountering friction forces that may adversely affect the power of the drive. Thus, the drive can be so configured that no fastening members for the gas spring become necessary as the spring can be supported by the housing or connection parts. This compact construction permits the provision of only a single gas spring for the furniture drive, whereby the length is only slightly smaller than the length of the spindle. When desiring to further increase the forces for lifting the furniture items, it may be suitable to utilize more than one gas spring, whereby the gas springs are positioned outside of the spindle and within the flanged tube at a same angular relationship. In this case, the forces applied by the individual gas springs add up.

In the event the electromotive furniture drive includes one or more gas springs, positioned outside the spindle, it is suitable to configure the lifting tube as multi-chamber tube with a plurality of chambers defining central longitudinal axes in spaced-apart parallel relationship to one another and to a central longitudinal axis of the spindle, whereby one of the chambers receives the spindle and the other chamber or chambers receive the gas spring or gas springs. Although this configuration does not impact on the applied force and the velocity of the lifting tube, the overall look is improved as the gas spring or gas springs become invisible.

According to another feature of the present invention, the lifting tube may have a cross section substantially in the form of an 8, when the gas spring is arranged outside the spindle. Suitably, the flanged tube may then exhibit a kidney-shaped cross section whereby the constriction on one side is located in the area between the two chambers of the lifting tube. In the event that only the spindle is positioned within a chamber whereas the gas spring is disposed in a free interior space between the inside wall surface of the lifting tube and the spindle, the flanged tube may exhibit an oval-shaped cross section. A material-saving construction is realized by profiling the inside wall surface of the flanged tube in circumferential direction, for example through provision of webs and recesses extending in longitudinal direction of the flanged tube.

According to another feature of the present invention, the piston rods of the gas springs move in and out with respect to a motor-distal end of the flanged tube and are coupled with one another and with the lifting tube. In this manner, the movements of the piston rods of the gas springs and the lifting tube are synchronized, whereby the interconnection with the lifting tube results in a transfer of the full force. Suitably, when the flanged tube accommodates two gas springs, which are offset to one another at an angle of 180°, a pin can be used to couple the piston rods and the lifting tube to one another.

According to yet another feature of the present invention, the gas springs may be coupled at their motor-proximal side with the flanged tube by means of a bolted connection.

According to another aspect of the present invention, the gas spring or gas springs may be controllable so that the furniture item may be stopped in any position. The control is preferably implemented by a valve. Through controlling the gas stream, a brake action is produced so that, optionally, the velocity of the output elements of the furniture drive can be regulated.

According to still another aspect of the present invention, the furniture drive is provided with a release mechanism, so that the descent of the attached furniture item can be implemented at a higher speed. The release mechanism includes a first coupling disk secured in fixed rotative engagement on the output journal of the drive, a second coupling disk wedged on the spindle at the end proximate to the first coupling disk and secured against execution of a rotation movement, and a coupling sleeve movable in an axial direction to realize an engagement of the first and second coupling disks, whereby the first coupling disk and the coupling sleeve have complementary engagement surfaces such that a movement of the lifting tube to the upwardly directed position is accompanied by a synchronous movement of the coupling sleeve through engagement by the first coupling disk. When implementing the adjustment in the same direction by hand, the coupling sleeve turns whereas the first coupling disk is at a standstill. The manual operation can be initiated in a simple manner by mounting to the coupling sleeve a release element which is shiftable in axial direction relative to the second coupling disk, and by providing compression springs for loading the coupling sleeve into engagement with the first coupling disk.

Through interaction of the coupling sleeve with both coupling disks, the upward and downward adjusting movements of the furniture item can be realized at running drive during normal operation. As, however, the coupling sleeve can travel in axial direction, there is the option to disengage the meshing engagement surfaces during normal operation so that the downwardly directed movement of the attached furniture item can be executed in a short time at respectively greater speed. When it is desired to lift the furniture item by hand, the drive runs in reverse as a movement of an articulated lever, provided to convert a linear movement of the drive in a tilting of the furniture item being adjusted, or vice versa, conjointly moves the spindle nut. The adjusting spindle is not self-locking and thus is caused to turn as the spindle nut moves linearly, resulting in a rotation of the second coupling disk and the attached coupling sleeve. By suitably shaping the engagement surfaces, it is possible to realize that the coupling sleeve rotates relative to the stationary first coupling disk. This is possible, because the coupling sleeve can shift in axial direction.

The release element may be a claw, a pull element, for example a Bowden cable or similar mechanism. The axial displacement of the release element relative to the second coupling disk may be realized, for example, by a suitably dimensioned keyway connection or a splined connection. When the release element is not in use, the compression springs urge the profiled engagement surfaces into meshing engagement. During lifting of the furniture item by hand, the compression springs permit the axial displacement required to rotate the coupling sleeve.

The release mechanism may also be implemented by rotatably mounting the worm wheel of the drive on a guide member which is securely fixed to the spindle. A coupling wheel is secured in fixed rotative engagement on the guide member but movable in axial direction for engagement and disengagement with the worm wheel. In this construction, the worm wheel is so designed that the power train to the adjusting spindle from the worm wheel during normal operation is transmitted via the coupling wheel and the guide member. When it is desired to execute the downward movement in a shortest possible time through a respective greater lowering speed, the coupling wheel is disengaged from the worm wheel. The spindle, the guide member and the coupling wheel then turn while the worm wheel and the drive are at a standstill. This configuration only insignificantly, if at all, alters the dimensions of the furniture drive compared to drives without release mechanism. Linkage of the worm wheel with the coupling wheel is realized by providing the worm wheel with circular teeth for meshing with complementary teeth on a confronting side of the coupling wheel. This results in a slip-free connection that can be subjected to great stress. Suitably, the teeth have a serrated configuration, and each tooth is bounded with respect to the rotation axes by a steep flank and a flat flank. During normal operation, the torque is transmitted via the steeper flanks of the teeth of the worm wheel and the coupling wheel when the furniture item is moved up. This torque transmission is executed, however, only in the respective rotation direction. In the opposite rotation direction, for example when lowering the attached furniture item, the coupling wheel turns and disengages form the worm wheel and shifts in axial direction.

BRIEF DESCRIPTION OF THE DRAWING

The above and other objects, features and advantages of the present invention will be more readily apparent upon reading the following description of preferred exemplified embodiments of the invention with reference to the accompanying drawing, in which.

DETAILED DESCRIPTION OF PREFERRED EMBODIMENTS

Throughout all the Figures, same or corresponding elements are generally indicated by same reference numerals.

Figure 1:
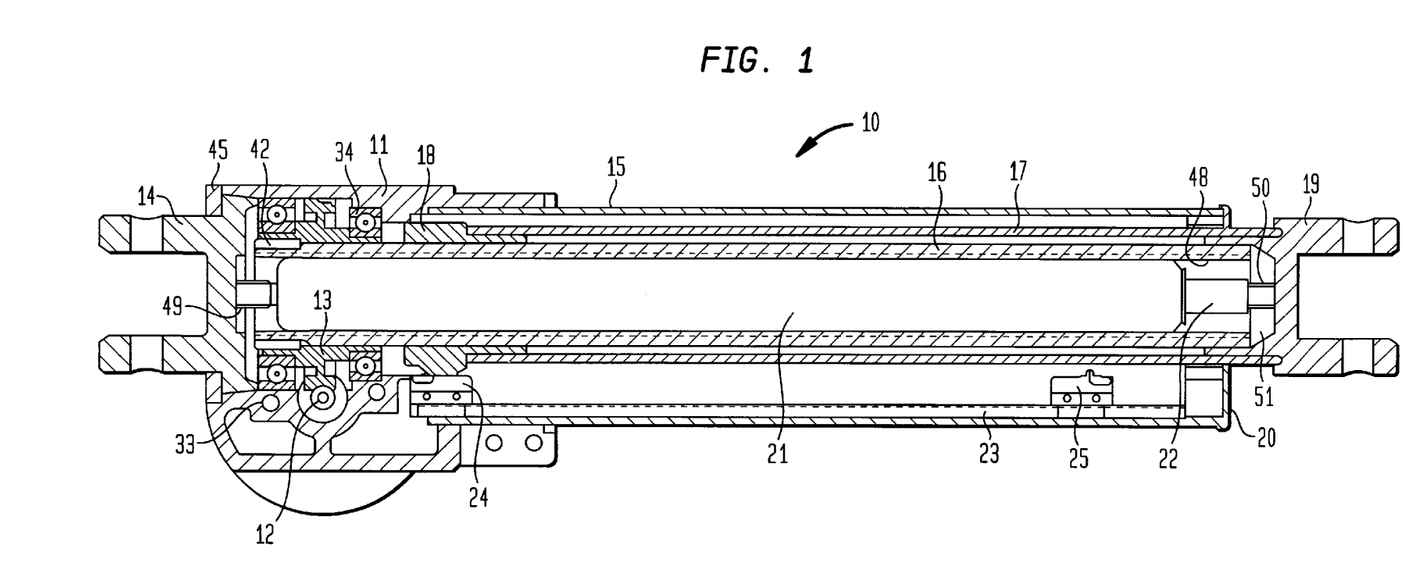
FIG. 1 is a sectional view of a first embodiment of an electromotive drive for a furniture item in accordance with the present invention.

Turning now to the drawing, and in particular to FIG. 1, there is shown a sectional view of a first embodiment of an electromotive drive in accordance with the present invention, generally designated by reference numeral 10, for up and down movement of a furniture item. The drive 10 includes a housing 11 which is dimensioned to accommodate an electric motor (not shown) and a reduction gear unit in the form of a worm gearing including a worm 12, driven by the electric motor, and a worm wheel 13 in mesh with the worm 12. Of course, the worm gearing may be replaced by a different type of reduction gear unit for installation in the housing 11. The worm gearing is supported by rolling contact bearings 33, 34. On the side of the worm gearing, the housing 11 is provided with a fork head 14 for attachment of the drive 10 to a stationary component of the furniture item. The other end, opposite to the fork head 14, of the housing 11 is open for insertion of a flanged tube 15 which has one end secured to the inside wall surface of the housing 11 and projects out of the housing 11. The housing-distal end of the flanged tube 15 is held in place and closed by a lid 20. The flanged tube 15 forms together with the housing 11 the outer side of the drive 10.

The worm wheel 13 is connected to an adjusting spindle 16 which is securely fitted in a bore of the worm wheel 13 and carries a spindle nut 18 so that a rotation of the spindle 16 is translated into a linear movement of the nut 18 along the spindle 16. Disposed between the flanged tube 15 and the spindle 16 is a lifting tube 17 which has one end securely fixed to the spindle nut 18. The lifting tube 17 extends through an opening of the lid 20 to the outside and supports on its other end a further fork head 19 for attachment of the drive 10 to a furniture component to be adjusted, for example, via an articulated lever (not shown), which is secured to the fork head 19.

The spindle 16 is hollow to define a bore 48 for receiving a gas spring 21 having one end formed with a mount 49 for support by the fork head 14. Of course, the gas spring 21 may be supported also by other parts of the housing 11. The gas spring 21 accommodates a piston rod 22 which can move in and out. At its end distant to the mount 49, the piston rod 22 has a thread 50 for securement of a disk 51 which is in positive engagement with the fork head 19.

Disposed interiorly of the flanged tube 15 is a continuous strip 23 which carries two spaced-apart limit switches 24, 25 for defining the end positions of the spindle nut 18.

During operation, actuation of the electric motor causes a rotation of the spindle 16 via the worm gearing in one direction, so that the spindle nut 18 travels along the spindle 16 to the right in FIG. 1 and conjointly moves the lifting tube 17 to lift the furniture item until the spindle nut 18 contacts the limit switch 25. The upward lifting of the furniture item is assisted by the gas spring 21 via the disk 51 which bears against the fork head 19 and is moved in synchronism with the lifting tube 17 by the piston rod 22. When lowering the furniture item, the spindle 16 is rotated in opposite direction, so that the spindle nut 18 and the lifting tube 17 move in opposite direction, i.e. are retracted until the spindle nut 18 contacts the limit switch 24. The gas spring 21 serves hereby as a brake to counter the own weight of the furniture item during descent.

Figure 2:
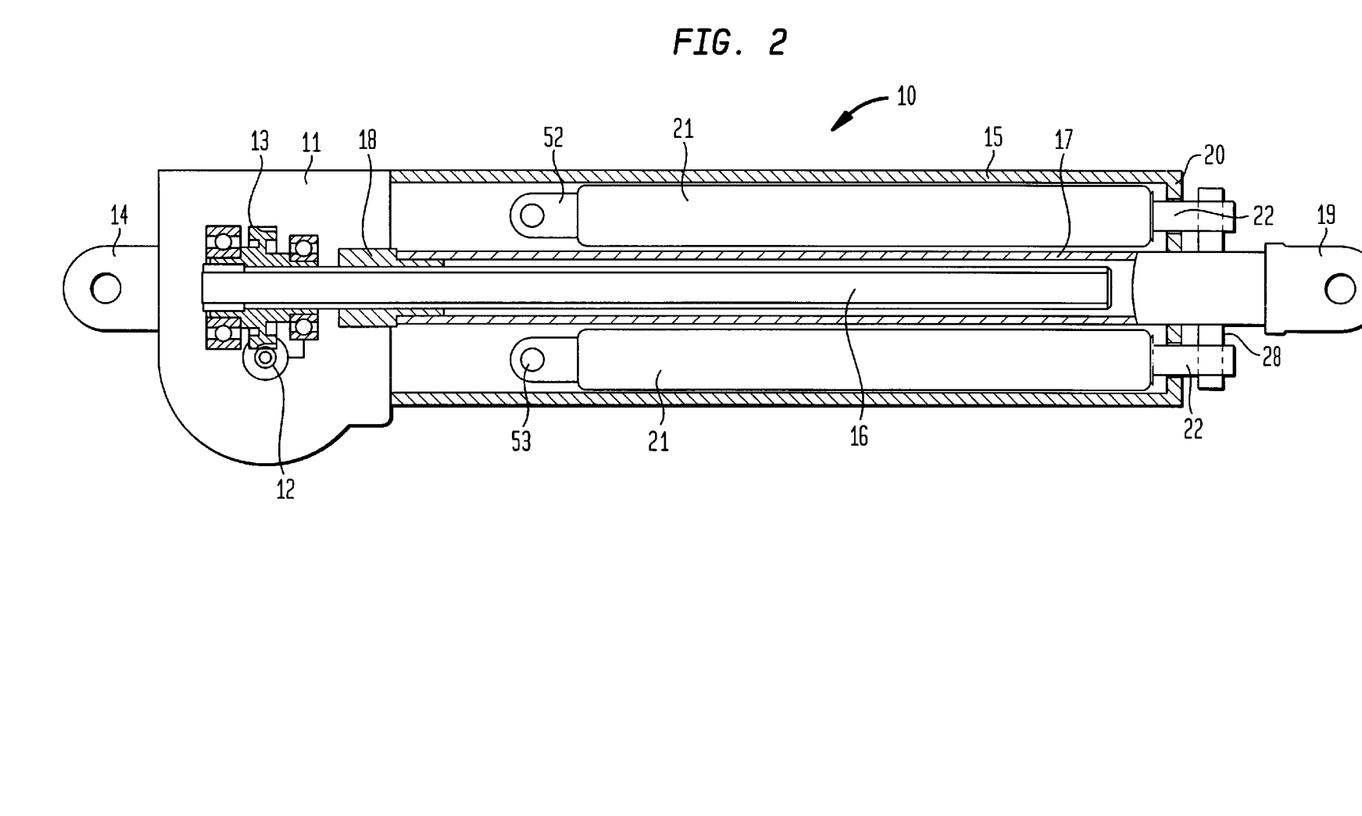
FIG. 2 is a sectional view of a second embodiment of an electromotive drive for a furniture item in accordance with the present invention.

FIG. 2 shows a sectional view of a second embodiment of an electromotive drive 10 for a furniture item in accordance with the present invention. Parts corresponding with those in FIG. 1 are denoted by identical reference numerals and not explained again. In this embodiment, provision is made for the arrangement of two gas springs 21 which are disposed in an intermediate space between the lifting tube 17 and the flanged tube 15. The spindle 16 is hereby solid and disposed inside the lifting tube 17 between the gas springs 21. At their ends facing the worm gearing, each of the gas springs 21 has a bracket 52 which is secured to the flanged tube 15 by a bolt 53. The piston rods 22 of the gas springs 21 are interconnected by a pin 28 which is also guided through aligned bores in the lifting tube 17 so that the lifting tube 17 and the piston rod 22 travel in synchronism and move the fork head 19 and thus the attached furniture item between retracted and extended positions. Both gas springs 21 are offset to one another at an angle of 180°.

Persons skilled in the art will understand that the drive 10 of FIG. 10 may include more than two gas springs 21 for disposition in the intermediate space between the flanged tube 15 and the lifting tube 17, whereby the gas springs are then disposed at a same angular distance from one another to avoid tilting moments. As mode of operation of the drive 10 of FIG. 2 is analogous to the drive 10 of FIG. 1, a further discussion is omitted for the sake of simplicity.

Figure 2A:
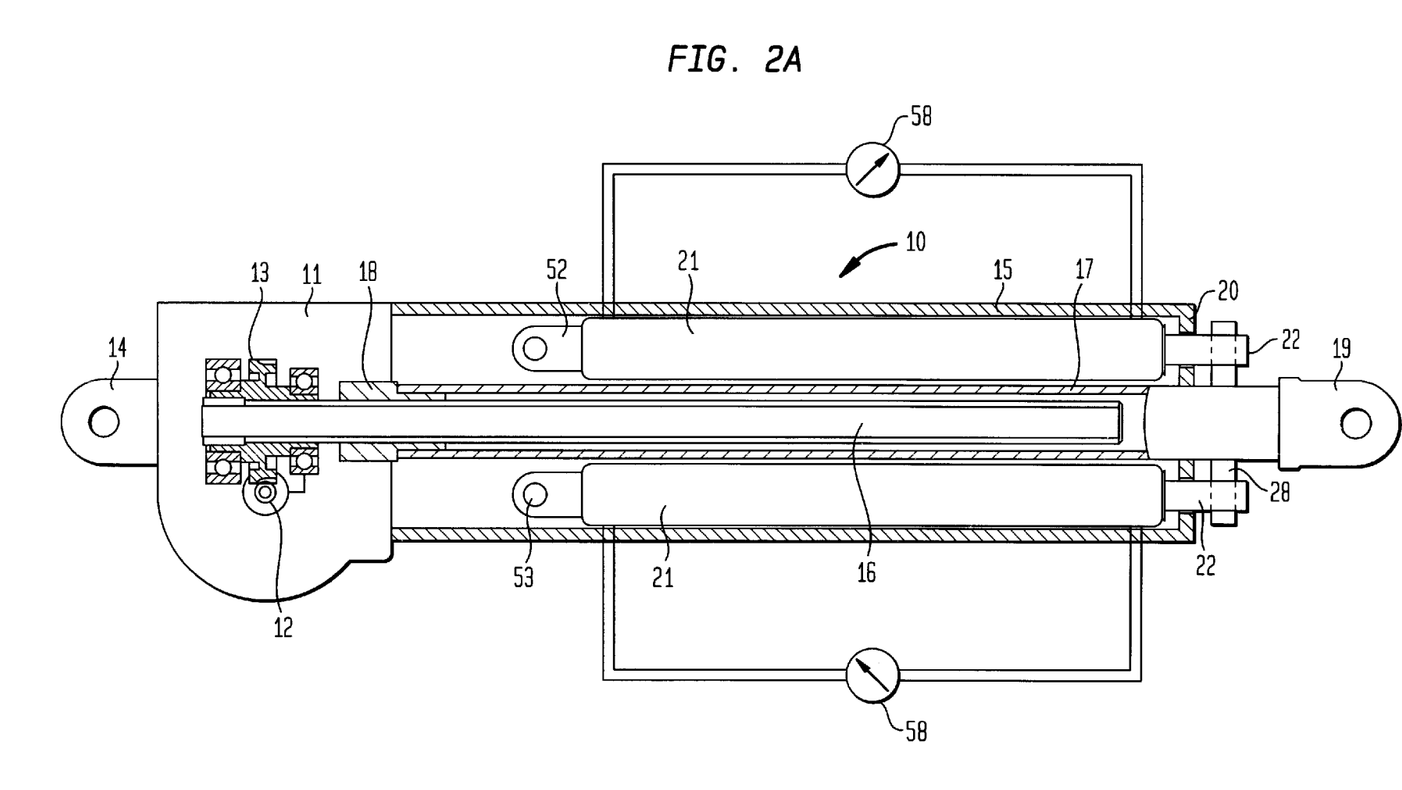
FIG. 2a is a sectional view of the electromotive drive of FIG. 2 with integrated control system for the gas springs.

As indicated in FIG. 2a, the drive 10 may have incorporated therein a control mechanism for each of the gas springs 21, for example valves 58, to allow the furniture item to be held in place in any suitable position, by controlling the gas stream and thereby a brake action applied by the gas springs 21 during lowering of the furniture item.

Figure 3:
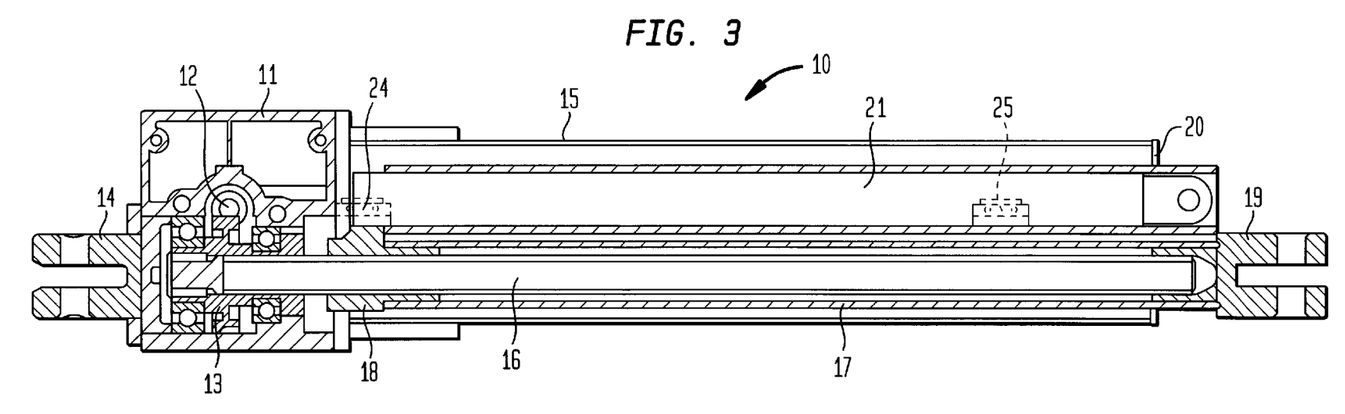
FIG. 3 is a sectional view of a third embodiment of an electromotive drive for a furniture item in accordance with the present invention.

FIG. 3 shows a sectional view of a third embodiment of an electromotive drive 10 for a furniture item in accordance with the present invention. Parts corresponding with those in FIG. 1 are denoted by identical reference numerals and not explained again. In this embodiment, the drive 10 has a single gas spring 21 in parallel spaced-apart relationship to the spindle 16. The gas spring 21 is thus disposed in the free interior space between the inside wall surface of the flanged tube 15 and the lifting tube 17. Thus, the gas spring 21 acts hereby parallel and at a distance to the direction in which the lifting tube 17 acts. This configuration of the drive 10 according to FIG. 3 is useful in situations when the lifting force of the gas spring 21 is sufficient to implement an upward movement of the furniture item, so that the provision of a cost-intensive hollow spindle according to FIG. 1 can be omitted so long as the moment caused by the offset disposition of the gas spring 22 does not interfere with the functions of the drive 10.

Figure 4:
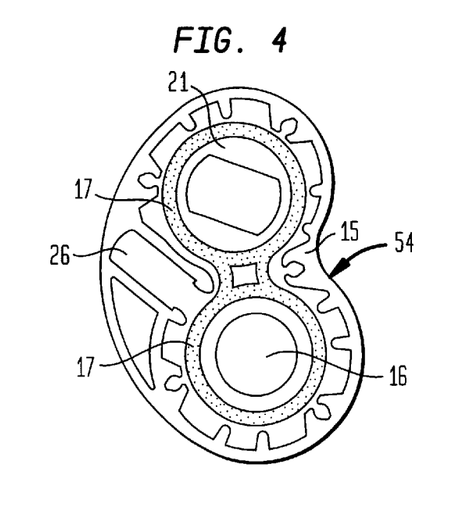
FIG. 4 is a schematic cross sectional view of a variation of an electromotive drive according to the present invention, showing in detail a configuration of a flanged tube and lifting tube for accommodating a spindle and a gas spring.

Turning now to FIG. 4, there is shown a schematic cross sectional view of a variation of the electromotive drive 10, showing in detail a configuration of the flanged tube 15 which accommodates the lifting tube 17, the spindle 16 and the gas spring 21. The lifting tube 17 is formed as double tube with two chambers in parallel, spaced-apart disposition, with the lifting tube 17 being configured approximately in the shape of an 8. Received in the lower chamber is the spindle 16 whereas the upper chamber accommodates the gas spring 21. In this manner, the gas spring 21 is invisible. The flanged tube 15 has a kidney-shaped configuration, with the lateral constriction 54 positioned approximately in midsection between the tow chambers of the lifting tube 17. A pocket 26 is provided for accommodating the strip 23 (not shown here) for the limit switches 24, 25.

Figure 5:
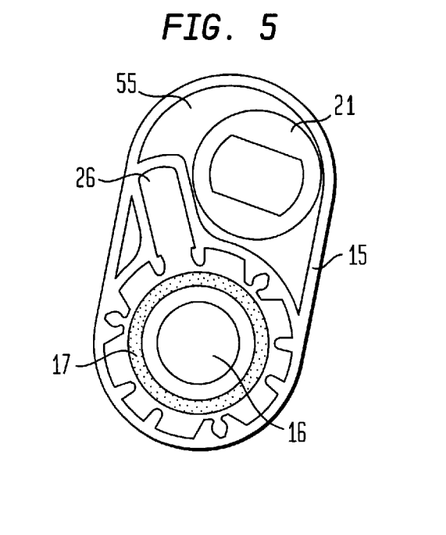
FIG. 5 is a schematic cross sectional view of a variation of the flanged tube and the lifting tube.

FIG. 5 shows another variation in which the flanged tube 15 has an approximately oval-shaped configuration. The gas spring 21 is arranged in a free space 55 between the inside wall surface of the flanged tube 15 and the lifting tube 17. The flanged tube 15 is also in this variation formed with a pocket 26 for accommodating the strip 23 (not shown here) for the limit switches 24, 25.

As further shown in FIGS. 4 and 5, the flanged tube 15 is, at least partially, profiled interiorly, i.e. the inside wall surface of the flanged tube 15 is formed in longitudinal direction with grooves and webs, thereby saving material while still attaining a sufficient load-carrying capability.

Figure 6:
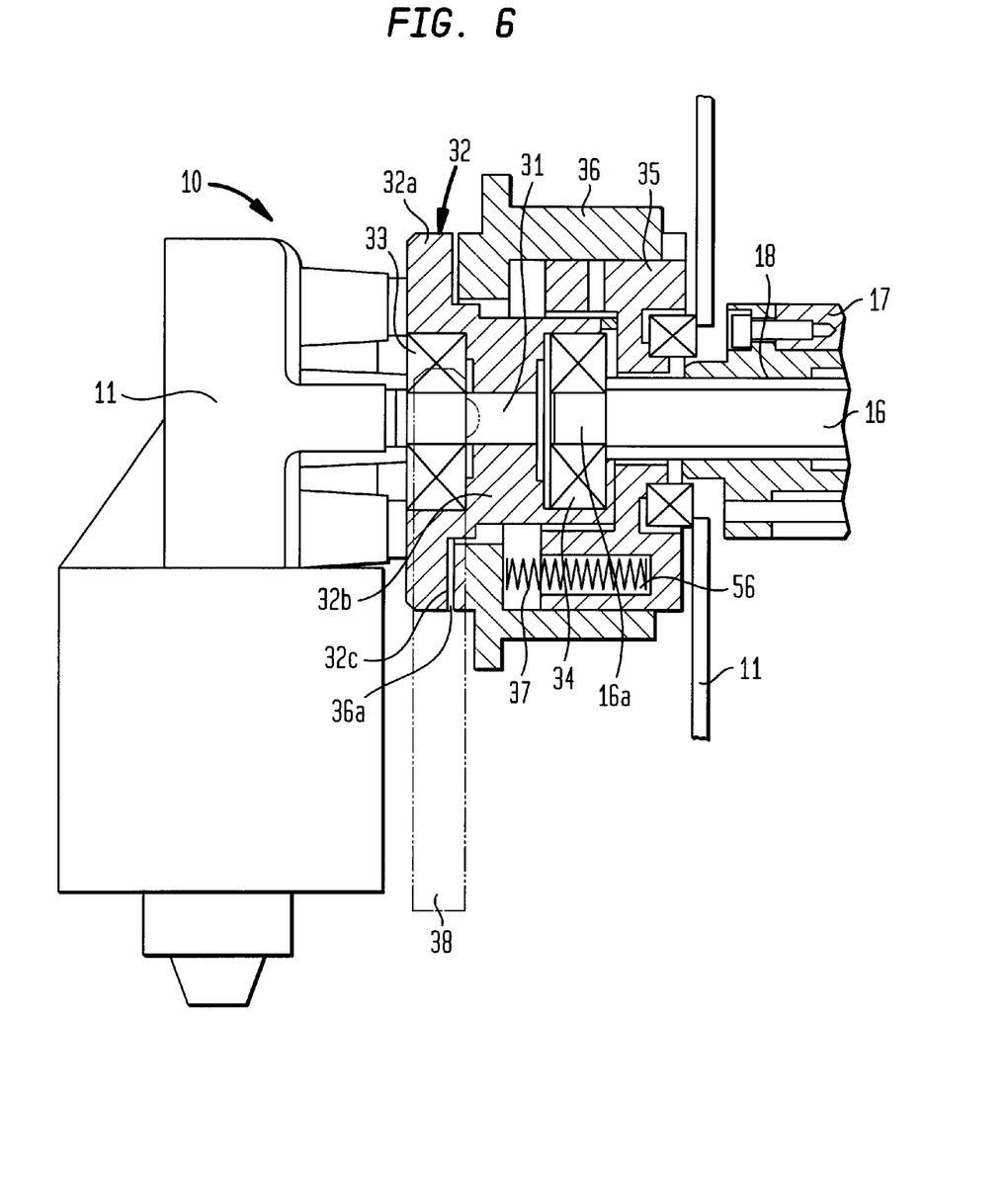
FIG. 6 is a fragmentary, cross sectional view of an electromotive drive according to the present invention, equipped with a first variation of a release mechanism.

Referring now to FIG. 6, there is shown a fragmentary, cross sectional view of an electromotive drive 10, equipped with a first variation of a release mechanism which includes a first coupling disk 32 secured in fixed rotative engagement on the output journal 31 of the electric motor of the drive 10. The coupling disk 32 has a flange 32a in confronting relation to the drive 10 and a hub 32b. Seated in a pocket of the coupling disk 32 is the rolling-contact bearing 33 in the form of a deep groove ball bearing. The output journal 31 terminates at a distance to the drive-distal end of the coupling disk 32. The spindle 16 projects into the coupling disk 32 in alignment with the output journal 31 and has a journal 16a of reduced diameter which is supported by the rolling-contact bearing 34 configured in the form of a deep groove ball bearing and positioned with its outer race in a recess of the coupling disk 32. Secured in fixed rotative engagement on the spindle 16 at a distance to the coupling disk 32 is a second coupling disk 35 which is in engaged connection with a coupling sleeve 36 via a keyway or splined connection. The coupling sleeve 36 is movable in axial direction relative to the coupling disk 35. The coupling disk 32 has an outer drive-distal ring surface 32c which is formed with teeth (not shown) for meshing with complementary teeth (not shown) on a confronting end face 36a of the coupling sleeve 36, when the drive is in normal operating state. The coupling disk 35 has pockets 56 about its outer peripheral area for accommodating compression springs 37 which load the coupling sleeve 36 to seek a meshed engagement with the coupling disk 32.

Mounted to the coupling sleeve 36 is a release element 38 in the form of a claw, indicated by dashdot line. When actuating the release element 38 by hand, the coupling sleeve 36 is moved away from the coupling disk 32 in opposition to the compression springs 37 to thereby disengage the toothed connection. As a consequence, the drive train for the spindle 16 is cut. The furniture item mounted to the drive 10 can now be adjusted by hand or can drop at relatively great pace from the upper position to the lower position by its own weight because upon adjustment of the furniture item by hand, the articulated lever presses against the confronting end face of the spindle nut 18 which is mounted on the spindle 16 and secured against rotation. As soon as the user lets go of the release element 38, the downward movement of the furniture item is interrupted, as the compression springs 37 urge the coupling sleeve 36 against the coupling disk 32.

Figure 7:
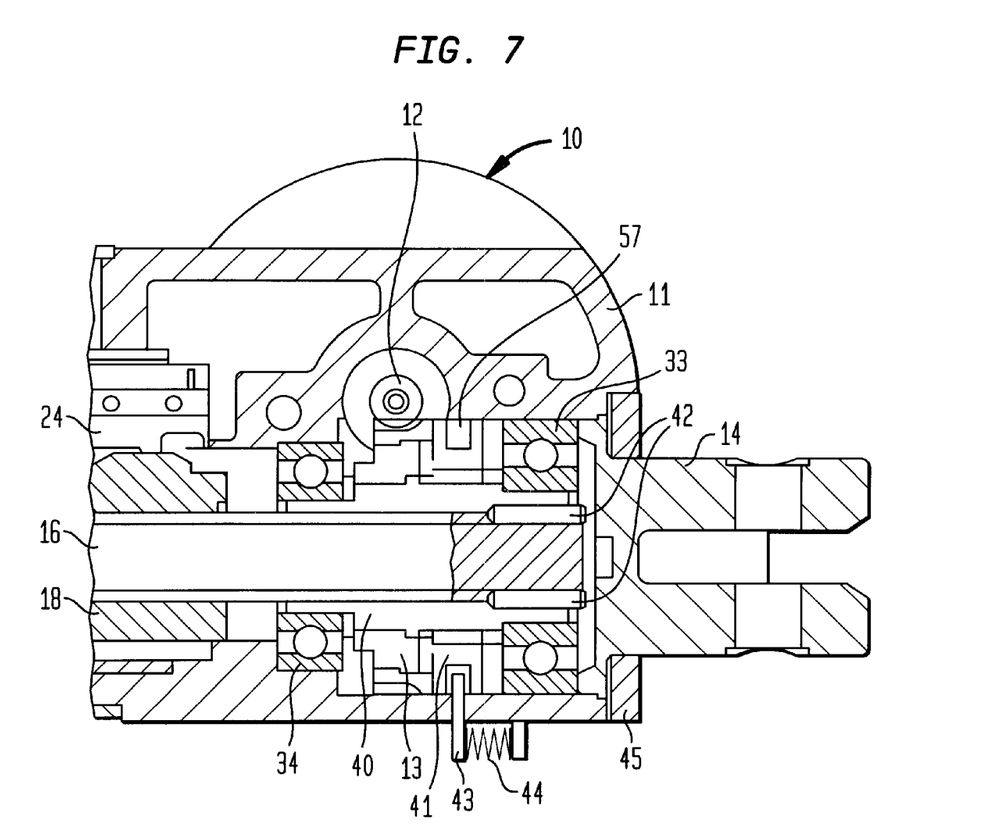
FIG. 7 is a fragmentary, cross sectional view of an electromotive drive according to the present invention, equipped with a second variation of a release mechanism.

FIG. 7 shows another variation of a release mechanism for the drive 10, shown in FIG. 1. Parts corresponding with those in FIG. 1 are denoted by identical reference numerals and not explained again. The drive 10 drives via the worm 12 the worm wheel 13 which freely turns on a guide member 40. Mounted in fixed rotative engagement on the guide member 40 is a coupling wheel 41 which is in engagement with the worm wheel 13 at the side facing away from the spindle nut 18, when the drive 10 is in normal operating state. The guide member 40 is secured in fixed rotative engagement upon the spindle 16 by means of pins 42 extending in axial direction of the spindle 16. The engagement between the coupling wheel 41 and the worm wheel 13 is implemented by a toothed connection, whereby the teeth have an asymmetric configuration, resembling saw teeth. Thus, each tooth is bounded by a steep flank which is parallel or substantially parallel to the rotation axes of the worm wheel 13 and the coupling wheel 41, and a flat flank.

When running the drive 10 for upward lifting the furniture item, the torque is transmitted by the steep flanks of the teeth. When the furniture item is lowered at running drive 10 and hereby blocked, for example by a body part, the coupling wheel 41 turns relative to the worm wheel 12 and shifts in opposition of the spring 44 in axial direction so as to run freely, thereby implementing a safety feature.

The coupling wheel 41 is further formed with a circumferential groove 57 for engagement of a release element 43 in the form of a release lever. The release element 43 is loaded by a spring 44 to urge the coupling wheel 41 into engagement with the worm wheel 13 via the toothed connection. In the event, the furniture item should be lowered at higher velocity through cutting the drive train, the release element 43 is actuated to thereby disengage the toothed connection between the coupling wheel 41 and the worm wheel 13. As the spindle 16 is not self-locking, it can rotate continuously without any braking action.

The guide member 40 has recessed axial ends for placement of the rolling-contact bearings 33, 34 to support the spindle 16. As further shown in FIG. 7, the housing 11 of the drive 10 is closed by a lid 45 at the axial end in immediate proximity of the fork head 14 which projects through a central opening of the lid 45 for attachment to the component, to be moved, of the furniture item.

While the invention has been illustrated and described as embodied in an electromotive drive for a furniture item, it is not intended to be limited to the details shown since various modifications and structural changes may be made without departing in any way from the spirit of the present invention.

What is claimed as new and desired to be protected by letters patent is set forth in the appended claims:

What is claimed is:

1. An electromotive drive for a furniture item, in particular lifting device; comprising:
   a housing;
   a motor mounted to the housing;
   a reduction gear unit interacting with the motor;
   a rotating spindle driven by the motor via the reduction gear unit and carrying a spindle nut which is secured against executing a rotational movement so as to move in a linear direction;
   a flanged tube mounted to the housing;
   a lifting tube received in the flanged tube and mounted to the spindle nut so as to be movable between retracted and extended positions when the spindle rotates and the spindle nut is moved in a linear direction; and
   at least one gas spring arranged within the flanged tube for assisting the lifting tube during a movement of the lifting tube to the extended position, said at least one gas spring having a piston rod which moves in and out in synchronism with the lifting tube.

2. The drive of claim 1 wherein the spindle is hollow to define an interior space, said at least one gas spring being received in the interior space of the hollow spindle.

3. The drive of claim 1 wherein the at least one gas spring is positioned outside of the spindle.

4. The drive of claim 3, and further comprising a second such gas spring positioned outside of the spindle.

5. The drive of claim 4 wherein the two gas springs are positioned outside the lifting tube and inside the flanged tube.

6. The drive of claim 5 wherein the two gas springs are positioned at a same angular distance.

7. The drive of claim 6 wherein the lifting tube is configured as multi-chamber tube with a plurality of chambers defining central longitudinal axes in spaced-apart parallel relationship to one another and to a central longitudinal axis of the spindle, one of the chambers receiving the spindle and two other ones of the chambers receiving the two gas springs in one-to-one correspondence.

8. The drive of claim 4 wherein the piston rod of the gas spring and a piston rod of the second gas spring move in and out with respect to a motor-distal end of the flanged tube, said piston rods being linked to one another and with the lifting tube.

9. The drive of claim 8, and further comprising a pin for coupling the piston rods and the lifting tube to one another.

10. The drive of claim 4, and further comprising a bolted connection for connecting the gas springs at a motor-proximal side with the flanged tube.

11. The drive of claim 1 wherein the at least one gas spring is positioned outside the lifting tube and inside the flanged tube.

12. The drive of claim 1 wherein the lifting tube is configured as multi-chamber tube with a plurality of chambers defining central longitudinal axes in spaced-apart parallel relationship to one another and to a central longitudinal axis of the spindle, one of the chambers receiving the spindle and another one of the chambers receiving the at least one gas spring.

13. The drive of claim 1 wherein the lifting tube has a cross section substantially in the form of an 8.

14. The drive of claim 12 wherein the flanged tube has a kidney-shaped cross section.

15. The drive of claim 1 wherein the gas spring is located in an interior space of the flanged tube outside the lifting tube, said flanged tube having an oval-shaped cross section.

16. The drive of claim 1 wherein at least one of an inside wall surface of the lifting tube and an inside wall surface of the flanged tube is, at least partially, profiled in circumferential direction.

17. The drive of claim 1 wherein at least one of an inside wall surface of the lifting tube and an inside wall surface of the flanged tube is, at least partially, profiled in circumferential direction in the form of webs and recesses.

18. The drive of claim 1, and further comprising a control member for so controlling operation of the at least one gas spring as to effect a braking action.

19. The drive of claim 1 wherein the motor has an output journal, and further comprising a release mechanism including a first coupling disk secured in fixed rotative engagement on the output journal, a second coupling disk wedged on the spindle on an end proximal to the first coupling disk and secured against execution of a rotational movement, and a coupling sleeve movable in an axial direction for engagement of the first and second coupling disks, said first coupling disk and said coupling sleeve having complementary engagement surfaces so that a movement of the lifting tube to the extracted position is accompanied by a synchronous movement of the coupling sleeve through the first coupling disk, and a movement in a same direction initiated by hand results in a rotation of the coupling sleeve while the first coupling disk is at a standstill.

20. The drive of claim 19, and further comprising a release element mounted to the coupling sleeve, said coupling sleeve shiftable in axial direction relative to the second coupling disk for disengagement of the first coupling disk from the coupling sleeve, and compression springs for loading the coupling sleeve into engagement with the first coupling disk.

21. The drive of claim 1 wherein the reduction gear unit has a worm wheel driven by the motor and rotatably mounted on a guide member which is securely fixed to the spindle, and further comprising a coupling wheel secured in fixed rotative engagement on the guide member but movable in axial direction for allowing engagement and disengagement with the worm wheel.

22. The drive of claim 21 wherein the worm wheel has circular teeth for meshing with complementary teeth on a confronting side of the coupling wheel.

23. An electromotive drive for lifting and lowering a furniture item, comprising:
   a rotating spindle carrying a spindle nut which is secured against executing a rotational movement so as to move in a linear direction as the spindle turns;
   a lifting tube securely fixed to the spindle nut and acting on a furniture item being lowered or lifted; and
   a force-applying member acting on the furniture item and movable in synchronism with the lifting tube to thereby assist a lifting of the furniture item and braking a lowering of the furniture item.

24. The drive of claim 23 wherein the force-applying member is at least one gas spring having a piston rod which moves in and out in synchronism with the lifting tube and thereby assists the lifting of the furniture item and braking the lowering of the furniture item.

25. The drive of claim 23 wherein the lifting tube has a cross section substantially in the form of an 8 to form two chambers, one chamber receiving the spindle and the other chamber receiving the force-applying member.

26. The drive of claim 23, and further comprising a motor for rotating the spindle, and a release mechanism for cutting a power train between the motor and the spindle to thereby allow a lifting and lowering of the furniture item by hand, said release mechanism including a first coupling disk secured in fixed rotative engagement on an output journal of the motor, a second coupling disk wedged on the spindle on an end proximal to the first coupling disk and secured against execution of a rotational movement, and a coupling sleeve movable in an axial direction for engagement of the first and second coupling disks, said first coupling disk and said coupling sleeve having complementary engagement surfaces so that a movement of the lifting tube to the extracted position is accompanied by a synchronous movement of the coupling sleeve through the first coupling disk, and a movement in a same direction initiated by hand results in a rotation of the coupling sleeve while the first coupling disk is at a standstill.

27. The drive of claim 26, wherein the release mechanism includes a release element mounted to the coupling sleeve and shiftable in axial direction relative to the second coupling disk, and compression springs for loading the coupling sleeve into engagement with the first coupling disk.

* * * * *